United States Patent
Lanning et al.

[15] 3,646,904
[45] Mar. 7, 1972

[54] REMOVABLE FLOTATION MEANS AND WATER DRIVE ASSEMBLY FOR SNOWMOBILES

[72] Inventors: Charles T. Lanning, 7305 Clinton Ave., Richfield, Minn. 55423; James T. Cook, 5 North Broadway, Watertown, S. Dak. 57201

[22] Filed: Oct. 31, 1969
[21] Appl. No.: 873,778

[52] U.S. Cl. ............................................. 115/1, 115/0.5
[51] Int. Cl. ............................................. B60f 3/00
[58] Field of Search ............................... 115/1, 0.5 A

[56] References Cited

UNITED STATES PATENTS 2,325,532   7/1943   Miller ........................... 115/0.5 A
3,521,595   7/1970   Mix ..................................... 115/1

Primary Examiner—Andrew H. Farrell
Attorney—Williamson, Palmatier & Bains

[57] ABSTRACT

A conversion kit including a pontoon assembly, steering rudder and propeller with interconnected drive shaft and power transmission is utilized to adapt a snowmobile for use as a water vehicle by being removably mounted thereon. Turning linkage attached to the rudder is connected to the ski spindle steering mechanism of the snowmobile for operation thereby. The transmission of the propeller drive assembly includes a power input shaft sized to be rotatably supported transversely of the snowmobile frame in the bearings where the front drive axle for the snowmobile track is normally mounted, the power input shaft being driven by the same sprocket and chain arrangement from the snowmobile engine ordinarily employed to drive the front drive axle.

6 Claims, 7 Drawing Figures

INVENTORS
CHARLES T. LANNING,
JAMES T. COOK
BY Williamson, Palmatier
& Bains  ATTORNEYS PATENTED MAR 7 1972 3,646,904
SHEET 2 OF 3
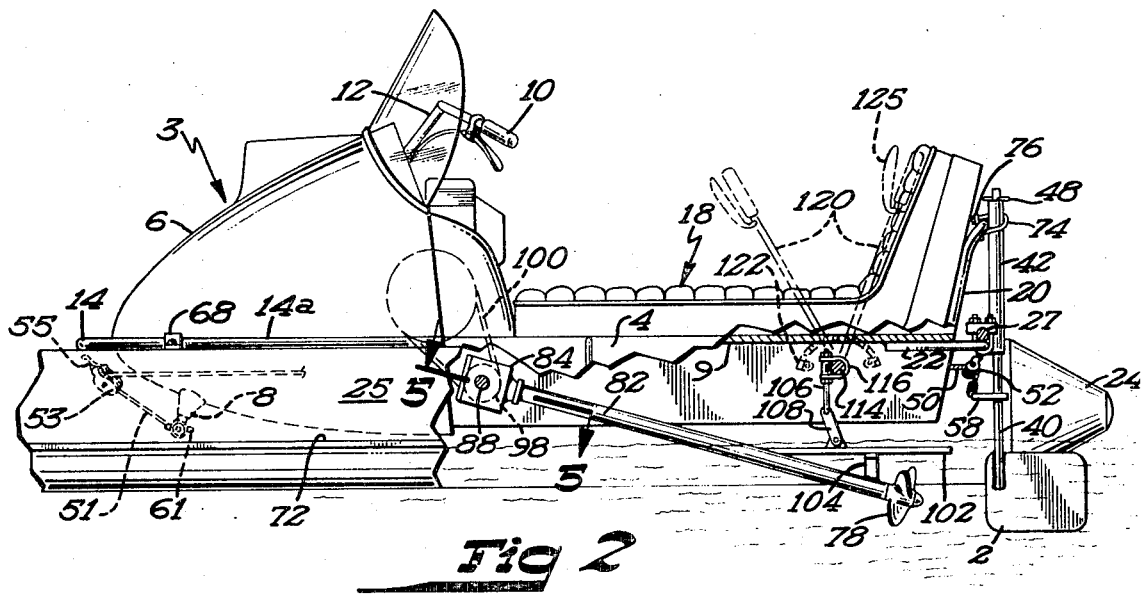
Fig 2
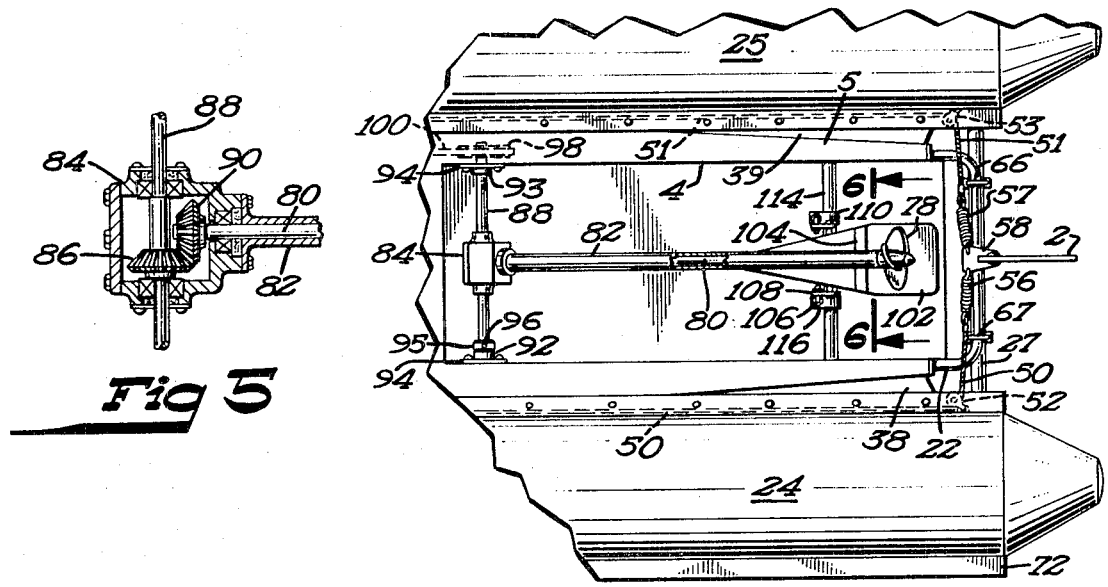
Fig 5
Fig 3
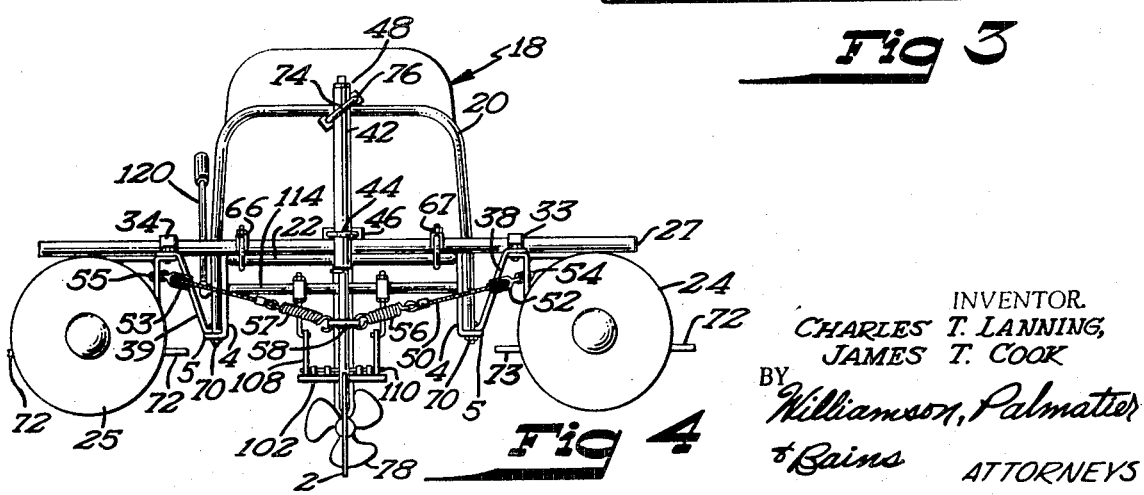
Fig 4
INVENTOR.
CHARLES T. LANNING,
JAMES T. COOK
BY Williamson, Palmatier
& Bains
ATTORNEYS INVENTORS
CHARLES T. LANNING,
JAMES T. COOK
BY Williamson Palmatier
& Bains ATTORNEYS

REMOVABLE FLOTATION MEANS AND WATER DRIVE ASSEMBLY FOR SNOWMOBILES

BRIEF SUMMARY OF THE INVENTION

There is wide spread and increasing use in the northern sections of the United States and in Canada of snowmobiles as recreational, camping and hunting vehicles. The snowmobile is a relatively expensive piece of recreational equipment having only a limited time span of usage during the winter months when snow and frozen lakes and rivers afford an opportunity for their proper and normal use by means of the engine driven tracks and skiis on which the snowmobiles are supported. The primary purpose of this invention is to provide a conversion kit which may be quickly and easily removably assembled to a snowmobile to permit the snowmobile to be used as a water vehicle in the summer time, and thus to make the snowmobile a multiseasonal recreational vehicle.

This basic objective is realized by utilizing a conversion kit comprised of flotation means, preferably in the form of a preassembled pontoon structure, a steering rudder with attached turning linkage, and a propeller drive assembly including a power transmission, all of which components are constructed to permit their removable mounting on a snowmobile with a minimum of time and effort. In the preferred embodiment of my invention, this is accomplished by a pontoon assembly comprised of a pair of elongated pontoons which are constructed and arranged to extend along opposite sides of a snowmobile to provide flotation support means therefor and which serve as mounting means for the steering rudder and turning linkage attached thereto.

A particularly advantageous feature of my invention resides in the utilization of cables as the linkage means for turning the rudder, a pair of cables being attached to the rudder and extending lengthwise along the opposed pontoons of the flotation assembly around pulleys secured to the pontoons, each of the turning cables having a coupling device at the forward end thereof constructed and located for detachable connection to the pair of turning spindles at the forward end of the snowmobile to which skiis are normally attached. By virtue of this arrangement, the steering mechanism of the snowmobile normally utilized for turning the skiis at the forward end of the snowmobile is conveniently employed for turning the rudder when using the snowmobile in water.

As a further beneficial feature of the snowmobile conversion kit of this invention, the propeller drive assembly is rendered easily mountable on the snowmobile for power drive by the snowmobile engine by means of a power input shaft to the transmission of the propeller drive assembly of such a length and diameter as to be interchangeable with the front drive axle for the snowmobile tracks. In converting a snowmobile for water use by means of my conversion kit, the front drive axle, tracks, skiis and bogie wheel units for supporting the track are removed. The aforesaid power input shaft of the propeller drive transmission is then mounted transversely of the snowmobile frame within the bearings normally utilized to rotatably support the front drive axle, one end of the power input shaft being connected to the engine-driven sprocket normally utilized to drive the front drive axle for the snowmobile track.

The snowmobile conversion kit of this invention is further uniquely distinguished by vertically adjustable mounting means for the steering rudder and propeller and its drive shaft supporting these components from the snowmobile body in such a way that they may be adjusted upwardly or downwardly to provide proper operation in water and to avoid interference with a trailer on which the converted snowmobile may be transported.

These and other objects and advantages of our invention will become readily apparent as the following description is read in conjunction with the accompanying drawings wherein like reference numerals have been used to designate like elements throughout the several views.

BRIEF DESCRIPTION OF THE DRAWINGS

FIG. 2 is a side, elevation view, partially in section, showing the various components of our conversion kit mounted on a snowmobile to adapt it for water operation;

FIG. 3 is a bottom plan view of the rear end of the converted snowmobile of FIG. 2;

FIG. 4 is a rear, elevation view of the converted snowmobile of FIG. 2;

FIG. 5 is a horizontal section view of the gear assembly for transmitting power to the propeller drive shaft portion of the conversion kit;

DESCRIPTION OF THE PREFERRED EMBODIMENTS

Figure 1:
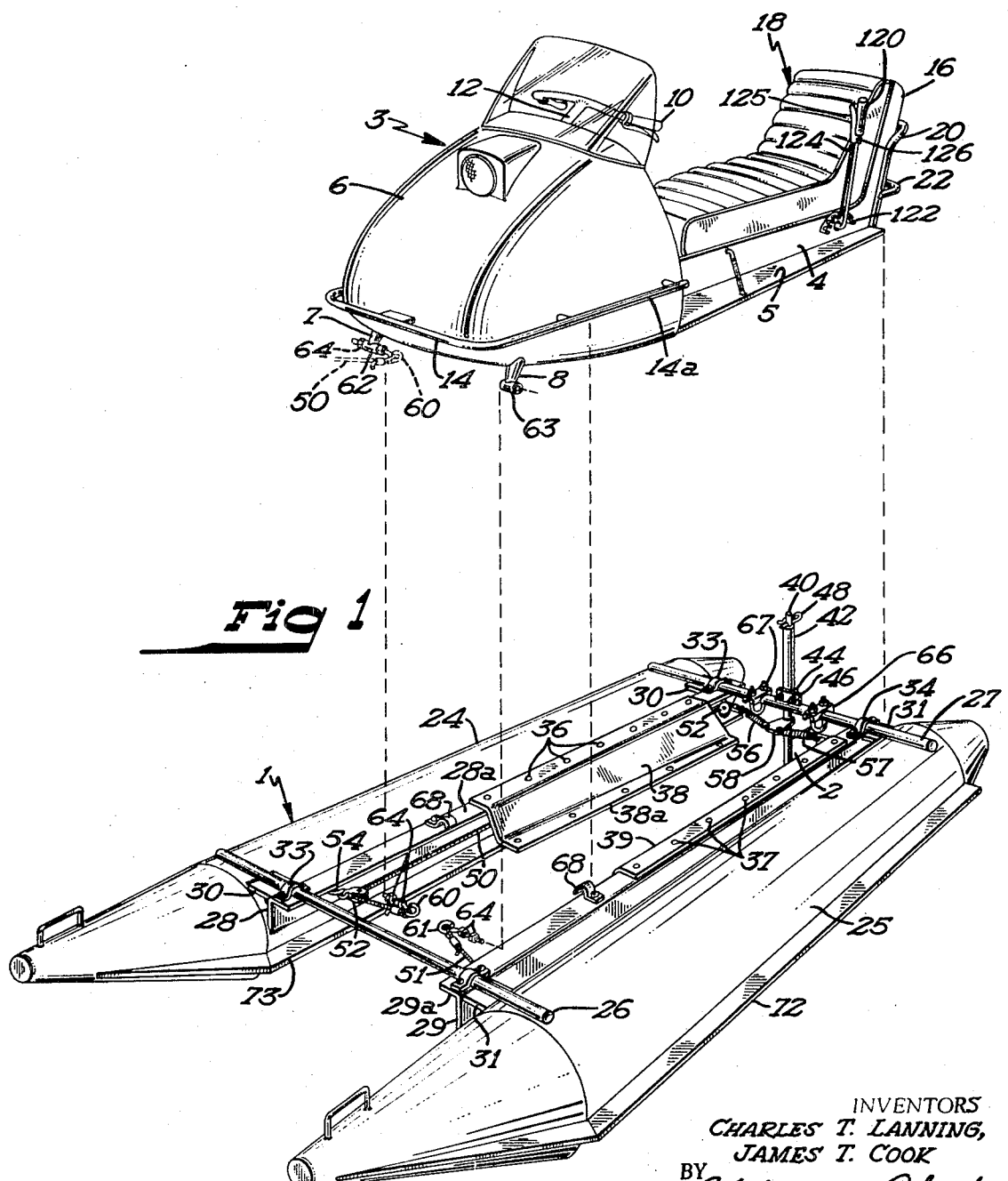
FIG. 1 is an exploded, perspective view showing the manner in which the pontoon assembly and steering portion of the conversion kit of this invention is mounted on a snowmobile.

Referring now to the drawings, I have shown in FIG. 1 the flotation assembly generally designated by reference numeral 1, and including in combination therewith steering rudder 2 and the rudder turning linkage of the conversion kit of this invention. The flotation assembly 1 and steering rudder 2 have been constructed and arranged for removable mounting on a snowmobile of conventional design designated by reference numeral 3 and shown in exploded perspective relation to flotation assembly 1 to indicate the orientation of the flotation assembly with respect to the snowmobile when assembled thereto. Snowmobile 3 is of standard, and known construction including a body frame 4 with side boards 5 thereon which serve as rests for the operator's and passenger's feet. Hood 6 encloses an engine (not shown) which drives a front axle by means of an ordinary chain and sprocket arrangement, the front drive axle being utilized to impart rotary movement to endless tracks supported on sprockets and bogie wheels on both sides of the snowmobile body at the rear end thereof. The tracks on which the snowmobile is ordinarily supported and driven, as well as the sprockets and bogie wheels therefor have been removed, along with the pair of skiis normally utilized to support the front end of the snowmobile on snow and ice, in order to ready the snowmobile for the mounting of the water-operation conversion kit thereon. The manner of assembling the skiis, drive tracks, track sprockets and bogie wheels to the snowmobile is well known in the art, and since these components form no part of this invention they have not been shown. The skiis are ordinarily connected to steering spindles 7 and 8 at the front end of the snowmobile, these spindles being rotatable by means of a conventional steering linkage connected to handle bar 10 through steering column 12. A front bumper bar 14 extends around engine hood 6, and back rest frame 16 for seat 18 is strengthened, reinforced and protected by rear, frame bars 20 and 22, more fully described hereinafter with respect to FIGS. 2, 3 and 4.

Flotation assembly 1 preferably takes the form of a pair of elongated pontoons 24 and 25 secured together by front and rear cross braces 26 and 27 prior to the installation thereof on snowmobile 3. Extending lengthwise along pontoons 24 and 25 are right angle flange strips 28 and 29 which are affixed to pontoons 24 and 25 at their lower ends as by welding in the case of metal pontoons, or by fasteners if the pontoons are made of plastic or fiberglass. Horizontally extending bracket plates 30 and 31 secured to the front and rear ends of flange strips 28 and 29 are welded or otherwise affixed to the wall surfaces of pontoons 24 and 25 and assist in holding flange strips 28 and 29 thereto as well as providing a support base for the outer ends of cross braces 26 and 27. Clamps 33 and 34 are utilized to hold the ends of cross braces 26 and 27 in secure engagement with horizontal flange portions 28a and 29a of flange strips 28 and 29. Depending downwardly and inwardly from flange strips 28 and 29 and affixed to horizontal flange portions 28a and 29a thereof by fasteners 36 and 37 are splash skirts 38 and 39. Horizontally extending flanges 38a and 39a at the lower end of splash skirts 38 and 39 are adapted to rest upon and be secured to side boards 5 of the snowmobile when the flotation assembly 1 is affixed thereto. The purpose of splash plates 38 and 39 is to keep water from splashing up on side boards 5 where the driver and passengers will be resting their feet. The disposition of splash skirts 38 and 39 with respect to side boards 5 of the snowmobile is shown most clearly in FIGS. 3 and 4.

Rudder 2 is positioned at the rear or stern end of pontoon assembly 1 and includes an upright rudder shaft 40 having steering rudder 2 secured to the bottom end thereof. Rudder shaft 40 is rotatably contained within sleeve 42 which is rigidly secured to cross brace 27 of the pontoon assembly by means of a U-bolt 44 embracing sleeve 42 and attached to bracket plate 46 which is welded or otherwise firmly affixed to cross brace 27. U-bolt 44 and its complementary bracket plate 46 appear more fully in FIG. 4. Rudder shaft 40 is vertically adjustable within sleeve 42 for reasons hereinafter explained, as well as being rotatable therein about a vertical axis defined by the longitudinal axis of sleeve 42. Cotter pin 48 serves to hold rudder shaft 40 within sleeve 42 when rudder 2 is in its lowered position of use as shown in FIG. 1. Turning movement for rudder 2 is provided by means of a linkage arrangement which preferably takes the form of a pair of turning cables 50 and 51 directed around pulleys 52 and 53 located at the front and rear ends of pontoons 24 and 25. As may be noted with reference to FIGS. 2, 3 and 4, pulleys 52 and 53 are attached to flange strips 28 and 29 by means of mounting links 54 and 55. Continuing to refer to FIGS. 1 through 4, we utilize coil spring connectors 56 and 57 to connect cables 50 and 51 at one end thereof to turning arm 58 on rudder shaft 40. Coil springs 56 and 57 serve to return rudder 2 to a straight center position and hold it there after it has been rotated one direction or the other during a steering maneuver by cables 50 or 51. From their point of attachment to rudder shaft 40, cables 50 and 51 extend forwardly around pulleys 52 and 53 to coupling means in the form of "eye" bolts 60 and 61 at the forward ends thereof. Eye bolts 60 and 61 are constructed and arranged for attachment to ski mounting and turning spindles 7 and 8 at the forward end of snowmobile 3. Spindles 7 and 8 include as integral portions thereof sleeve connectors 62 and 63 within which the shanks of "eye" bolts 60 and 61 are received and secured by nuts 64 in the manner indicated in phantom lines on the snowmobile in FIG. 1. The skiis which support the front end of the snowmobile during winter operation have bifurcated coupling portions on the upright coupling spindles thereof which are removably secured to sleeve connectors 62 and 63 by fasteners extending therethrough.

The removable attachment of pontoon assembly 1 to snowmobile 3 is accomplished by means of U-bolts 66 on cross brace 27 and by clamps 68 affixed to horizontal flange portions 28a and 29a of flange mounting strips 28 and 29. Before mounting the pontoon and rudder assembly on snowmobile 3, the front end skiis, drive tracks, and front and rear axles, drive sprockets and supporting bogie wheels for the tracks are first removed so that the snowmobile will be in the condition shown in FIG. 1 for attachment of the water-operation conversion kit thereto. The snowmobile body rests on pontoon assembly 1 with pontoons 24 and 25 extending longitudinally along the opposite sides of the snowmobile side frames 4 in the arrangement shown in FIGS. 3 and 4. Pontoon assembly 1 is secured to the snowmobile by hooking clamps 68 over the top of rearwardly extending portions 14a of front bumper bar 14 as is indicated in FIGS. 1 and 2, and by utilizing U-bolts 66 to attach cross brace 27 of the pontoon assembly to transversely extending rear frame bar 22 of the snowmobile in the arrangement shown in FIGS. 2, 3 and 4. Cross brace 27 rests on top of frame bar 22 and U-bolts 66 are fastened to complementary clamping plates 67 which are of C-shape to fit around the top of cross brace 27. Support is further provided for the front end of snowmobile 3 by the abutting engagement of rearwardly extending portions 14a of bumper bar 14 along the top of flange portions 28a and 29a of flange strips 28 and 29. On certain types of snowmobiles, it will be possible to so locate front cross brace 26 of the pontoon assembly as to be able to clamp it to the front end of bumper bar 14 of the snowmobile as a further means of insuring that the pontoon assembly will be securely held in place on the snowmobile body and frame. With pontoon assembly 1 in place on the snowmobile as shown in FIGS. 2, 3 and 4, lower flange portions 38a and 39a of splash plates 38 and 39 will be resting on top of side boards 5 and are secured thereto by means of fasteners 70 shown in FIG. 4. Eye bolts 60 and 61 at the forward end of turning cables 50 and 51 are inserted within sleeves 62 and 63 on turning spindles 7 and 8 and removably held in place therein by means of retention nuts 64. By inserting eye bolts 60 and 61 in place within sleeves 62 and 63 with the "eye" portion thereof disposed inwardly and cables 50 and 51 extending forwardly therefrom around pulleys 52 and 53 at the forward end of pontoons 24 and 25, adequate turning leverage is obtained to impart sufficient movement to cables 50 and 51 that rudder 2 will respond to steering movement of handle bar 10. The turning radius of the snowmobile in water, and the responsiveness of rudder 2 to turning movements of steering handle 10 can further be adjusted by loosening retention nuts 64 and shifting eye bolts 60 and 61 lengthwise within sleeves 62 and 63 of steering spindles 7 and 8 to obtain more or less turning leverage.

It is to be noted that pontoons 24 and 25 are provided with laterally projecting flanges 72 and 73 on both sides thereof, these flanges extending along the entire length of the pontoons and functioning as supplementary flotation devices to prevent pontoons 24 and 25 from sinking too deep into the water under the weight of snowmobile 3 and the passengers riding therein.

In addition to being supported on cross brace 27 of the pontoon assembly by U-bolt 44, the rudder assembly is further secured by utilizing a second U-bolt 74 and complementary bracket plate 76 to hold the upper end of rudder sleeve 42 to upper frame bar 20a of rear frame bar 20. In FIGS. 2 and 4, rudder shaft 40 is shown in the lower position of use in which it is set when the snowmobile has been converted into a watercraft. With rudder shaft 40 in its lowermost position, rudder 2 will be under the surface of the water to provide proper steering action for the snowmobile. For those occasions when it is desired to transport the snowmobile on a trailer with the watercraft conversion kit mounted thereon, rudder shaft 40 is raised within sleeve 42 in order to elevate rudder 2 to a position wherein it will not interfere with the trailer. This is accomplished by removing cotter pin 48 from rudder shaft 40, sliding shaft 40 upwardly within sleeve 42 and then inserting cotter pin 48 through a second aperture (not shown) in shaft 40 to hold it in its elevated position.

In order to provide motive power for the converted snowmobile when it is used as a water craft, the conversion kit further includes a propeller 78 and its associated drive assembly which will now be described with reference to FIGS. 2, 3 and 4. In the embodiment of our invention shown in these figures, propeller 78 is mounted on the end of an elongated drive or power output shaft 80 which is contained within an elongated housing 82 secured at its inner end to a transmission case 84. As is shown in FIG. 5, transmission case 84 houses a drive gear 90 secured to the inner end of propeller drive shaft 80. Power is transmitted from input shaft 88 to output or propeller drive shaft 80 by the driving engagement of bevel pinion or gear 86 with driven gear 90. As a particularly advantageous feature of our power drive unit, input shaft 88 is of such a length and diameter as to be supportable transversely between side frame members 4 of snowmobile 3 within bearings 92 and 93 within which the front drive axle for the snowmobile tracks is normally rotatably supported. This drive axle has been removed, along with the tracks and their drive sprockets and supporting bogie wheels in order to place the snowmobile in condition to receive the water conversion kit. Bearings 92 and 93 are secured to side frame members 4 by means of brackets 94. Shaft 88 is held in place by means of a lock collar and set screw 95, 96 on bearing 92, the releasing of lock collar 95 by loosening set screw 96 permitting the front drive axle to be shifted laterally within bearings 92 and 93 and removed from the bearings prior to the mounting of power input shaft 88 therein. As may be noted with respect to FIGS. 2 and 3, power input shaft 88 utilized to transmit power to propeller 78 is attached at one end thereof to drive sprocket 98 which is driven by chain 100 which extends around a complementary sprocket coupled to the crank shaft of the snowmobile engine. The sprocket and chain drive arrangement 98, 100 is normally utilized to supply rotary power to the front drive axle ordinarily supported between bearings 92 and 93 for driving the track sprockets. Thus, there is no need to modify the power drive arrangement of the snowmobile other than to remove the front drive axle and to mount power input shaft 88 of the propeller drive unit in its place between bearings 92 and 93.

Figure 6:
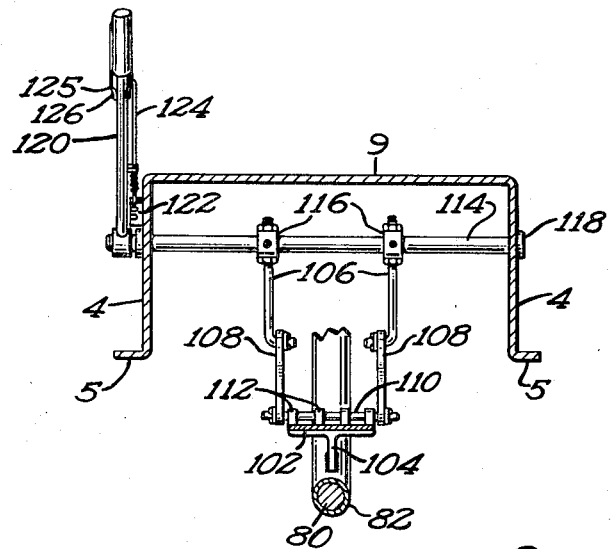
FIG. 6 is a vertical section view taken along lines 6—6 of FIG. 3 and showing the lift mechanism for the propeller drive shaft.

For the purpose of insuring that propeller 78 has a proper head of water in which to operate so that it will be able to propel the snowmobile adequately in water, a cavitation plate 102 is supported over propeller 78 in the manner shown in FIGS. 2, 3 and 6. Horizontally extending cavitation plate 102 is so located in overlying relation to propeller 78 that it will normally be disposed a short distance of at least one inch below the surface of the water to assist in insuring a liquid head free of bubbles within which propeller 78 can operate. Cavitation plate 102 thus functions in the same, well-known manner as do similar cavitation plates or devices normally employed in combination with boat and ship propellers. Cavitation plate 102 is secured at its inner end to drive shaft housing 82, as by welding, and is supported therefrom by a T-shaped bracket 104 welded to the top of drive shaft housing 82 and to the underside of plate 102.

Since the portion of the propeller drive unit including elongated, rearwardly and downwardly extending drive shaft 80, drive shaft housing 82 and propeller 78 would normally interfere with a trailer on which the snowmobile in the form of a watercraft might be transported, provision has also been made for raising and lowering the drive shaft assembly to permit trailering and beaching of the snowmobile as well as its operation in shallow water. To this end, a lifting mechanism is connected to the lower end of drive shaft housing 82 by attachment to cavitation plate 102. As appears most clearly in FIGS. 2, 3 and 6, the lifting mechanism is comprised of interconnected linkage arms 106 and 108, lower linkage arms 108 being connected to cavitation plate 102 by means of connecting rod 110 extending transversely through upright, apertured ears 112 which are welded or otherwise secured to the top of cavitation plate 102. Upper linkage arms 106 are secured to rotary shaft 114 of the lift mechanism for rotation therewith by means of C-clamps 116 to which they are threadedly attached. Shaft 114, along with the linkage mechanism including arms 106 and 108 forms a part of the conversion kit, shaft 114 being rotatably supported between side frame members 4 of the snowmobile within bearings 118 provided for that purpose. Holes must be drilled in side frame members 4 to permit the mounting of bearings 118 and shaft 114 transversely therebetween. Lift mechanism operating level 120 is connected to one end of rotary shaft 114, lever 120 being movable forwardly and rearwardly to impart rotary movement to shaft 114. A ratchet mechanism comprised of a notched retention member 122 and pivotal release arm 124 is utilized to hold lever 120 in the various positions to which it might be moved. The ratchet mechanism appears most clearly in FIG. 1. The lower end of release arm 124 may be engaged and disengaged from any one of the notches within retention plate 122 by applying pressure to hand grip portion 125 thereof and pivoting arm 124 about pivotal connection 126 with operating lever 120. In order to lower the entire propeller and drive assembly, operating lever 120 is moved to the rearward position shown in solid lines in FIG. 2 wherein linkage arms 106 and 108 will depend downwardly as shown. The depth at which propeller 78 will be submerged, and thus the operating and drive characteristics of the propeller can be adjusted by setting operating lever 120 in various ones of the notches of ratchet plate 122. In order to raise propeller 78 and drive shaft housing 82 upwardly for beaching the snowmobile water craft, driving it in shallow water or placing it on a trailer, operating lever 120 is moved forwardly to thereby rotate shaft 114 in a counterclockwise direction as viewed in FIG. 2. This will cause linkage arm 106 to pivot rearwardly and upwardly with the result that the lower end of propeller drive shaft 82 and propeller 78 will be raised up within the tunnel or recess space defined between snowmobile side frames 4. It will of course be appreciated that as the rear end of propeller drive shaft housing 82 is raised or lowered by the lift mechanism it will pivot freely at its inner end about the horizontal axis defined by power input shaft 88, by virtue of the rotation of shaft 88 within bearings 92 and 93.

We contemplate that the installation of our conversion kit on a snowmobile could further be simplified by rotatably supporting shaft 114 of the lift mechanism between bearing brackets provided on the rear end of pontoon assembly 1. Such bearing brackets for shaft 114 could be mounted, for example, on cross brace 27. This modification would eliminate the necessity for mounting shaft 114 between side frames 4 of the snowmobile during the conversion operation.

Figure 7:
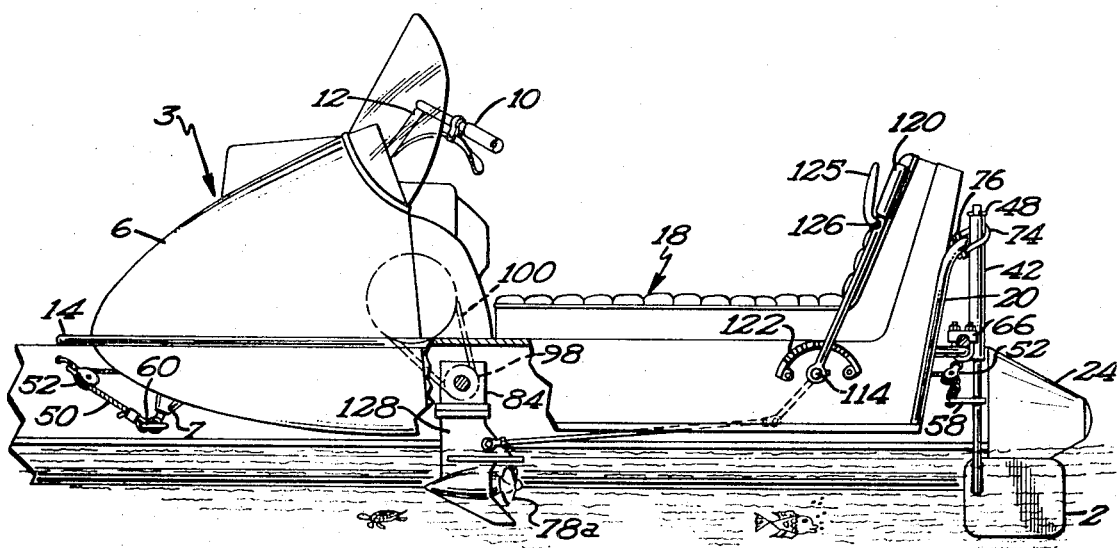
FIG. 7 is a side elevation view, partially broken away, showing a modified version of a snowmobile conversion apparatus wherein the propeller drive assembly is located directly under the front drive axle position of the snowmobile.

In FIG. 7, we have shown a modified version of the propeller drive unit for our conversion kit. In this arrangement, power input SHAFT 88 and transmission gears 86 and 90 are utilized in the same manner as explained above to transmit power by means of a chain and sprocket drive arrangement from the snowmobile engine to the drive shaft for the propeller 78a. In this case, however, a standard lower power unit of an outboard motor generally designated by reference numeral 128 is connected directly to the underside of transmission case 84 with driven gear 90 being oriented substantially horizontally on a vertically depending drive shaft (not shown) extending downwardly directly under power input shaft 88 within the housing of power unit 128. The power unit includes an integral cavitation plate 102a disposed under the water level directly above propeller 78a. Power unit 128 may likewise be pivoted upwardly within the space defined between snowmobile side frames 4 by means of operating lever 120 and a modified linkage mechanism secured rotary shaft 114. Linkage arm 106a is directly connected to shaft 114 for rotation therewith, and is pivotally attached at its lower end to an elongated linkage arm 130 connected to the housing of power unit 128. The forward movement of operating lever 120 will serve to rotate primary linkage arm 106a rearwardly to pull elongated linkage arm 130 rearwardly and upwardly with the result that the power unit will pivot upwardly about the horizontal axis of power input shaft 88 to raise propeller 78 and the lower end of power unit 128 for beaching or trailering the water craft-snowmobile.

What we claim is:

1. In combination with a snowmobile, flotation, steering and drive means to permit said snowmobile to operate as a water vehicle comprising:

a pontoon assembly having a pair of elongated pontoons extending along each side of the body of said snowmobile and removably secured thereto;

a steering rudder detachably connected to said snowmobile and having linkage means connected thereto for providing turning movement thereof about a vertical axis, said linkage means extending forwardly from said rudder and being connected to the ski spindle turning mechanism of said snowmobile for operation thereby;

a power output shaft drivingly connected to a propeller supported below said snowmobile for imparting movement to said snowmobile in water, said power output shaft being connected by power transmission means to a power input shaft rotatably supported between the side frames of said snowmobile in bearings within which the front drive shaft of said snowmobile is normally supported, said power input shaft being connected at one end thereof to the engine driven sprocket normally utilized for driving said front drive shaft of said snowmobile.

2. A snowmobile modified for water operation as defined in claim 1 wherein:
said rudder includes an upright shaft vertically slidable and adjustable to different elevations within a mounting sleeve secured to said snowmobile.

3. A snowmobile modified for water operation as defined in claim 1 wherein:
said power output shaft is contained within an elongated housing secured at its inner end to a transmission case containing said power transmission means and rotatable about the horizontal axis defined by said power input shaft, said elongated housing having a linkage mechanism connected thereto by means of which it may be lowered or raised into the space defined between said side frame of said snowmobile by pivotal movement about said horizontal axis.

4. A snowmobile modified for water operation as defined in claim 1 wherein:
said power output shaft extends longitudinally rearwardly from said power input shaft within an elongated housing; and further including
a generally horizontally extending cavitation plate secured to said elongated housing in overlying relation to said propeller.

5. A snowmobile modified for water operation as defined in claim 4 wherein:
said elongated housing is pivotally supported at the inner end thereof for pivotal movement about the horizontal axis defined by said rotatably supported power input shaft; and
further including a lift mechanism having linkage means connected to said cavitation plate by means of which said power output shaft, elongated housing and propeller may be lowered and raised by pivotal movement about said horizontal axis.

6. A conversion kit for adapting a snowmobile for use as a water vehicle comprising:
flotation means removably attachable to a snowmobile;
a steering rudder at the rear end of said flotation means;
linkage means connected to said rudder for providing turning movement thereof about a vertical axis, said linkage means extending forwardly from said rudder and including coupling means at the forward end thereof particularly constructed and located for detachable connection to the ski spindle turning mechanism of said snowmobile; and
power transmission means including a power input shaft adapted to be connected at one end thereof to the engine drive mechanism to which the front drive shaft of said snowmobile is normally connected, said power input shaft being of such a length and diameter as to be rotatably supportable transversely between the side frames of said snowmobile within the bearings normally provided in said side frames for rotatably supporting the front drive shaft of said snowmobile, and said power transmission means further including a power output shaft driven by said power input shaft through gear means and drivingly connected to a propeller for imparting movement to said snowmobile in water.

* * * * *